United States Patent [19]
Beall et al.

[11] Patent Number: 5,173,453
[45] Date of Patent: Dec. 22, 1992

[54] VARIABLY TRANSLUCENT GLASS-CERAMIC ARTICLE AND METHOD FOR MAKING

[75] Inventors: George H. Beall, Big Flats; Linda R. Pinckney, Corning, both of N.Y.

[73] Assignee: Corning Incorporated, Corning, N.Y.

[21] Appl. No.: 773,455

[22] Filed: Oct. 9, 1991

[51] Int. Cl.$^5$ ............... C03C 10/14; C03C 10/12; C03C 3/085; C03C 3/078

[52] U.S. Cl. .................................. 501/4; 501/7; 501/9; 501/72; 65/33

[58] Field of Search .............. 501/4, 6, 7, 55, 68, 501/69, 72; 65/33

[56] References Cited

U.S. PATENT DOCUMENTS

| | | | |
|---|---|---|---|
| 3,812,689 | 5/1974 | Reade | 65/33 |
| 4,018,612 | 4/1977 | Chuyng | 106/39.7 |
| 4,084,974 | 4/1978 | Beall et al. | 106/39.7 |
| 4,461,839 | 7/1984 | Rittler | 501/4 |
| 4,835,121 | 5/1989 | Shibuya et al. | 501/4 |
| 5,010,041 | 4/1991 | Koyama et al. | 501/4 |
| 5,064,461 | 11/1991 | Morena et al. | 65/33 |
| 5,070,045 | 12/1991 | Comte et al. | 501/4 |

*Primary Examiner*—Mark L. Bell
*Assistant Examiner*—Michael Marcheschi
*Attorney, Agent, or Firm*—Timothy M. Schaeberle; Clinton S. Janes, Jr.

[57] ABSTRACT

This invention is directed toward of a glass-ceramic article consisting essentially, expressed in terms of weight percent on the oxide basis, of about 64–70% $SiO_2$, 18–22% $Al_2O_3$, 3.3–4% $Li_2O$, 2–5% ZnO, 0–2% MgO, 1.5–3.5% $ZrO_2$, 0.5–2.5% $TiO_2$, 3.5–4.5% $ZrO_2+TiO_2$, 0.5–1.5% $As_2O_5$ and 0–0.5% $SnO_2$. The glass-ceramic article disclosed herein, is comprised of adjacent areas which exhibit visible transmissions ranging from transparent-to-opaque. The transparent areas are clear, transparent and essentially colorless and contain stuffed $\beta$-quartz as essentially the sole crystal phase. On the other hand, the translucent-to-opaque areas contain $\beta$-spodumene as the predominant crystal phase with a minor amounts of gahnite crystals resulting from the thermal transformation of said stuffed $\beta$-quartz. This gahnite phase is present in an amount sufficient to compensate for the transformation of said stuffed $\beta$-quartz to $\beta$-spodumene, resulting in a dimensional change, expressed in terms of density change, of essentially zero.

10 Claims, 1 Drawing Sheet

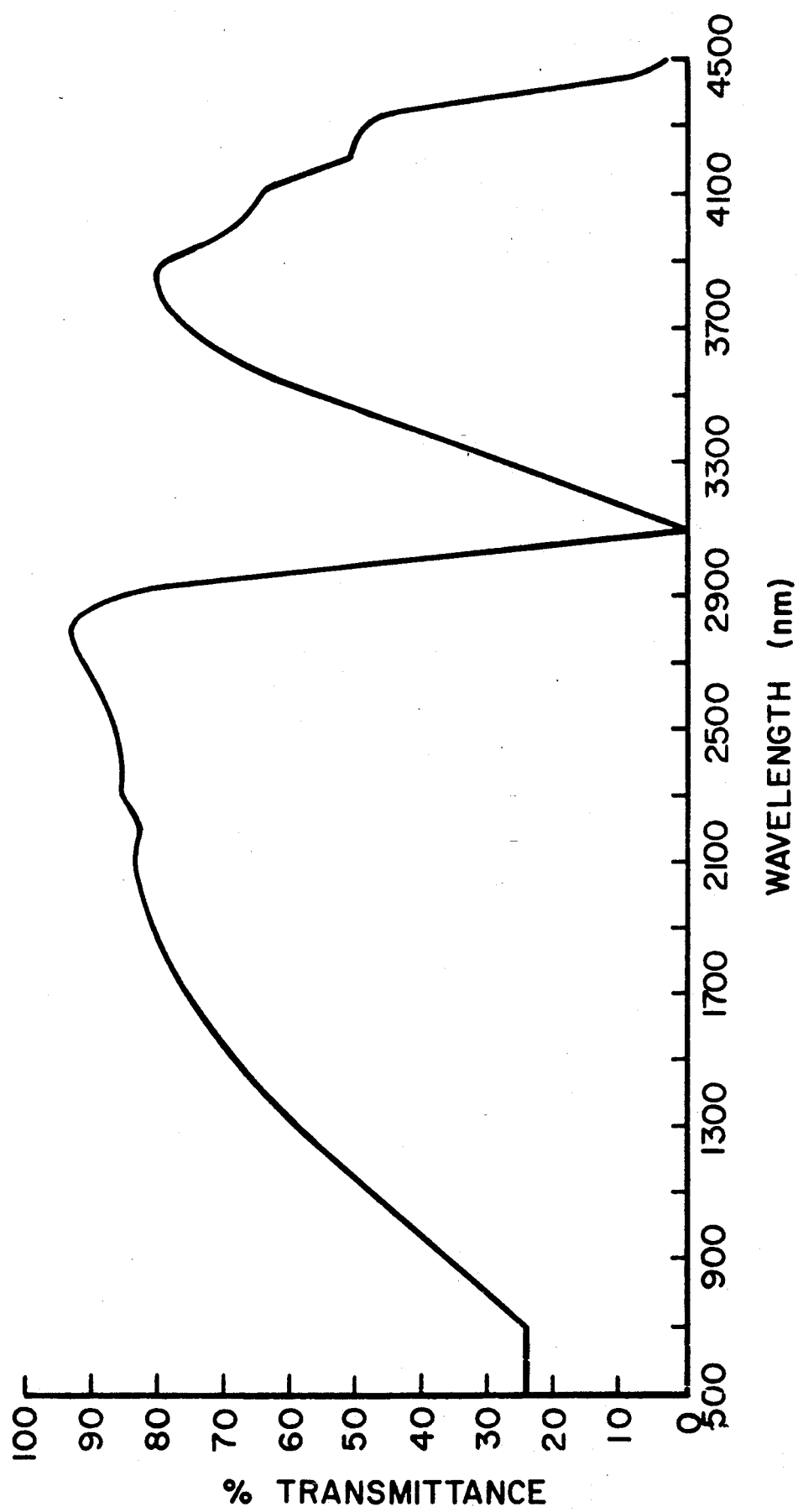

VARIABLY TRANSLUCENT GLASS-CERAMIC ARTICLE AND METHOD FOR MAKING

BACKGROUND OF THE INVENTION

The present invention is in the field of glass-ceramic articles and particularly relates to glass-ceramic articles having different and adjacent crystal phase areas. Stated another way, this invention relates to the field of variably translucent glass-ceramic articles suitable for use as stove tops and fire-door windows.

Recent developments in range-top design such as the radiant halogen burner require the transmission of near infrared and red visible light to allow both rapid heating and a visual indication of heat transfer. Up to now, materials which accomplish these ends have been dark transparent stuffed β-quartz glass-ceramics doped with vanadium or cobalt to give a black appearance in reflected light, but transmit in the red and near infrared. These materials have low or near-zero thermal expansion characteristics, but are not typically strong mechanically, with abraded flexural strengths well below 10 ksi or 70 Mpa.

U.S. Pat. No. 4,211,820 (Cantaloupe et al.) discloses such a glass-ceramic material. This transparent glass-ceramic, useful for smooth-top cooking stoves, displays a warm brown coloration sufficient to conceal a heating element when not in use but permitting visible observation thereof when in operation. Compositionally, this material consists essentially, expressed in terms of weight percent on the oxide basis, of about 2.5–4.5% $Li_2O$, 1–2% $MgO$, 19.5%–21% $Al_2O_3$, 66.5%–68% $SiO_2$, 4–5% $TiO_2$ and 0.02%–0.2% $V_2O_5$. This glass-ceramic article consists of a surface layer composed of β-quartz solid solution crystals as the predominate phase with, optionally, a minor proportion of β-spodumene solid solution dispersed in glassy matrix, while the interior portion contains β-spodumene solid solution crystals as the predominant crystal phase dispersed within a glassy matrix.

A variation of the above disclosed glass-ceramic is described in U.S. Pat. No. 4,835,121 (Shibuya). This patent discloses a strengthened, infrared transparent glass-ceramic article consisting of β-quartz solid solution crystals alone dispersed within a glass matrix and displaying, a thickness of 3 mm, a dark or black appearance, a transmittance of about 5% or less for a visible of a wavelength of 500 nm or less, and a transmittance of about 80% or more for infrared radiation at a wavelength of 1,500 nm, as well as having a bending strength of 20,000 psi or more. Compositionally, this glass-ceramic consists essentially, by weight of 60–72% $SiO_2$, 14–28% $Al_2O_3$, 2.5–5.5% $Li_2O$, 0.1–0.9% $MgO$, 0.1–0.9% $ZnO$, 3–6% $TiO_2$, 0.03–0.5% $V_2O_5$, 0.1–1% $Na_2O$, 0–1% $K_2O$, 0–2% $CaO$, 0–2% $BaO$, 0–2% $PbO$, 0–2% $As_2O_5$, 0–3% $ZrO_2$, and 0–3% $P_2O_5$.

In either of these above described glass-ceramics, the phase transformation from metastable β-quartz solid solution to stable β-spodumene solid solution would normally involve a dimensional change of usually over 1%. Therefore, in utilizing these compositions for large articles like a range-top, it is likely that this phase transformation change would result in cracking due to dimensional variations across the article. For this reason, glass-ceramic articles, like those above, usually contain either all β-quartz or all β-spodumene crystals so to avoid this excessive dimensional change. However, some glass-ceramic articles do contain mixtures, i.e., a dominant crystal phase with trace amounts of a minor phase, but these articles have not undergone a complete phase change which would result in large dimension changes. These mixed, dominant/minor phase systems, however, usually result in glass-ceramic articles with diminished mechanical properties.

Therefore, the primary objectives of this invention are:

1. to provide for a glass-ceramic which may contain distinct areas of different crystallization adjacent to each other through different crystallization; specifically, β-quartz areas adjacent to β-spodumene/gahnite mixed phase areas, which results in a glass-ceramic with variable translucency across its dimension;

2. to provide for a glass-ceramic which undergoes near zero dimensional change as it thermally changes from the β-quartz crystal form to the β-spodumene crystal form; and, 3. to provide for a transparent, clear and essentially colorless glass-ceramic article which has the ability to change rapidly to the opaque state without the large dimensional changes which typically result in cracking of the article.

Utilizing this type of material for flat stovetops would be quite ideal, both safety-wise and aesthetically. The resultant stovetop could be comprised of a variably translucent sheet—clear or slightly translucent burner areas in an otherwise opaque white colored sheet. Alternatively, the overall stovetop could also be of one translucence.

Additionally, this glass-ceramic would be ideal for fire door windows. Typically, prior art glass-ceramics, when exposed to high temperatures, such as that of flames, would crack due to excessive internal stresses created when specific areas were phase changed, while other, adjacent areas were not. In other words, the dimensional change experienced in the phase changed areas of the glass-ceramic, as compared to the other non-transformed areas, was large enough to cause cracking.

SUMMARY OF THE INVENTION

The solution to the above problem is one objective to which the inventive material is directed at, i.e. a glass-ceramic which does not crack as a result of selective area transformation. This is due to the fact that the transformation of crystal phases does not involve a large enough dimensional change to result in large internal stresses.

Specifically this invention concerns $Li_2O$—$Al_2O_3$—$SiO_2$ glass-ceramics which exhibit minimal dimensional change in the β-quartz-to-β-spodumene phase transformation. These glass-ceramics are characterized by their compositions, expressed in terms of weight percent of constituent oxides: 64–70% $SiO_2$, 18–22% $Al_2O_3$, 3.3–4% $Li_2O$, 2–5% $ZnO$, 0–2% $MgO$, 1.5–3.5% $ZrO_2$, 0.5–2.5% $TiO_2$, 3.5–4.5% $ZrO_2+TiO_2$, 0.5–1.5% $As_2O_5$ and 0–0.5% $SnO_2$. Because of this essentially zero dimensional change that exists, $Li_2O$—$Al_2O_3$—$SiO_2$ glass-ceramics may contain both phases within the same article. Since the β-quartz phase is clear, transparent and essentially colorless for this glass-ceramic and the β-spodumene is increasingly translucent as more crystals are formed, the glass-ceramic article possesses the ability to exhibit variable translucence.

One added feature of this composition is the clarity and essential lack of color that the β-quartz containing phases possess—clear enough for use in window-type applications.

The inclusion of ZnO in carefully controlled concentrations results in a dimensional change of near-zero, which is necessary for minimized stress. For the inventive glass-ceramic materials, the phase transformation from β-quartz to β-spodumene produces only very minor dimensional changes because the crystallization of the less dense β-spodumene is accompanied by the exsolution of the more dense phase gahnite ($ZnAl_2O_4$), thus giving an average dimensional change of essentially zero. Preferably, the dimensional change, measured in the instant invention by the change in density from the clear β-quartz to white translucent β-spodumene state, which these glass-ceramic articles exhibit, does not exceed $+/-0.75$ %. To achieve this minimal change in dimension, the accompanying gahnite phase must constitute at least 4% by weight. In other words, there must be sufficient amounts of the dense gahnite phase to compensate for the transformation from the β-quartz to the less dense β-spodumene. Preferably, gahnite will be present in amounts between about 4–11% by weight.

This above described dimensional change of essentially zero allows the inventive glass-ceramic to exhibit the following behavior; the transparent glass-ceramic article which contains β-quartz as the predominate crystal phase, is allowed to have areas which when exposed to extreme temperatures such as that of flames, will rapidly change to an opaque glass-ceramic containing β-spodumene as the predominate crystal phase with minor amounts of gahnite crystals.

The composition domains are critical for obtaining the desired properties in the glass and glass-ceramic.

$Al_2O_3$ must be kept above 18% in order to achieve optimum transparency in the β-quartz glass-ceramic as well as a low thermal expansion coefficient. The $Al_2O_3$ level must be kept below 22% in order to ensure a low enough mullite liquidus to prevent devitrification during glass forming. Higher alumina levels also contribute to undesirable distortion on ceramming.

The relative concentration of $Li_2O$, ZnO, and MgO are critical in controlling the thermal expansion of the glass-ceramic and the clarity of the transparent β-quartz material. These oxides also affect the glass-working characteristics.

$Li_2O$ must be kept above 3.3% in order to ensure a very low thermal expansion coefficient in the glass-ceramic (less than $5\times10^{-7}$/°C. in the β-quartz solid solution and less than $12\times10^{-7}$/°C. in the β-spodumene solid solution glass-ceramic). This level of lithia also provides a workable glass viscosity. Greater than 4% $Li_2O$, however, leads to unstable glasses (given these alumina levels) and an undesirable tendency toward devitrification. Finally, lithia levels below the claimed range tend to suppress the β-quartz to β-spodumene transformation.

Given alumina levels of 18–22%, ZnO must be kept below 5% in order to avoid opalization of the glass. A minimum of 2% ZnO is, however, required in order to produce sufficient crystallization of gahnite to ensure the desired minimal dimensional change during the phase transformation from the transparent metastable β-quartz state to the translucent or opaque β-spodumene state.

In addition, high ZnO, in amounts approaching and exceeding 5.0%, coupled with low lithia, below the claimed range of 3.3–4.0%, tends to suppress the the β-quartz to β-spodumene transformation, while at the same time causing early separation of the gahnite phase. This combination results in glass-ceramic articles which possess an excessive dimensional change capability.

The divalent cation oxides, MgO and ZnO, are key components for promoting the solubility for $ZrO_2$ in the glass. MgO serves as a major flux for $ZrO_2$ dissolution in the glass, and also stabilizes the glass against devitrification. The level of MgO must be kept below 2%, however, in order to achieve an acceptably low thermal expansion coefficient.

The $SiO_2$ level is basically constrained by that of the other components, particularly alumina. In general, too high a silica level produces an undesirably viscous, seedy glass, while too low a level, coupled with higher alumina, results in too high a mullite liquidus temperature. In addition, low silica coupled with high lithia leads to spodumene devitrification.

$Na_2O$ and $K_2O$ increase the amount of residual glass in the final glass-ceramic, raising the thermal expansion coefficient and causing undesirable haze in the transparent β-quartz solid solution material.

The most efficient nucleation in this family of glass-ceramics is achieved with mixtures of $ZrO_2$ and $TiO_2$, optimally 3.5 to 4.5%. However, for optimized clarity and colorlessness in the β-quartz solid solution glass-ceramic, desired for this invention, it is necessary to keep the level of $TiO_2$, in the mixture, to the minimum required for efficient nucleation, because $TiO_2$ lends an undesirable brownish tint to the glass-ceramics, thus reducing the clarity of the glass-ceramic. The composition area we claim is unusual in its relatively high levels of $ZrO_2$; no other commercial glasses are capable of dissolving higher levels of $ZrO_2$ because of their aforementioned levels of the fluxes MgO and ZnO.

It is possible to utilize conventional colorants for glass, such as $Fe_2O_3$, $CeO_2$, CoO, $Cr_2O_3$, CuO, $MnO_2$, NiO, CdS, Se, CdO, and $V_2O_5$ in small amounts (typically less than 1% total).

As has been explained above, the β-quartz solid solution crystals constituting the predominant crystal phase in the transparent glass-ceramic bodies are developed by heat treating the precursor glass bodies at temperatures below those leading to the generation of β-spodumene solid solution crystals. Stated in another way, β-quartz solid solution crystals evolve within a particular range of temperatures and are transformed into β-spodumene solid solution crystals as the temperature is raised to higher levels. To illustrate, β-quartz solid solution crystals are developed within the temperature interval of about 850°–950° C. and undergo conversion to β-spodumene solid solution crystals at temperatures above 950° C. To prevent the occurrence of thermal deformation during the heat treatment process, the maximum crystallization temperatures will not exceed about 1100° C.

To assure the production of clear, essentially colorless and transparent articles, i.e., articles virtually free of haze, the β-quartz solid solution crystals will have very small dimensions, viz., diameters less than 0.5 micron. To achieve crystals of such small dimensions, the precursor glass will customarily be subjected to a relatively low temperature nucleation heat treatment to generate a myriad of nuclei therein to provide points for the growth of β-quartz crystals thereon. The presence of the many nuclei leads to the growth of many small crystals rather than fewer large crystals, the dimensions of the latter being large enough to scatter light passing through with resultant haze.

Accordingly, with the present inventive compositions the precursor glass articles will initially be fired to a temperature within the range of about 700°–850° C. and maintained within that interval for about 1–5 hours to obtain a high degree of nucleation, followed by heating the nucleated glass to within the range of about 850°–950° C. to grow β-quartz solid solution crystals on the nuclei, where the articles are held for about 0.5–4 hours. (It will be appreciated that the articles do not need to be maintained at a single temperature within those intervals, but only within those ranges for a sufficient length of time to secure high nucleation followed by crystal growth.)

To assure relatively uniformly-sized crystals of β-spodumene solid solution, the precursor glass will again be exposed to a nucleation heat treatment to obtain a high level of nuclei prior to raising the temperature above 950° C. to grow β-spodumene solid solution crystals on the nuclei. The exposure period to secure a high degree of crystallization is again about 0.5–4 hours within the temperature interval of about 950°–1100° C.

DISCUSSION OF PRIOR ART

U.S. Pat. No. 3,812,689 (Reade) discloses a method for producing a fine-grained glass-ceramic article exhibiting a coefficient of thermal expansion (25°–900° C.) below about $10 \times 10^{-7}/°C$. and excellent creep resistance and dimensional stability up to about 1000° C., wherein β-spodumene solid solution constitutes the principal crystal phase and gahnite constitutes the secondary crystal phase. Although this disclosure is directed towards a Li-Al-Si system, it has the added requirement that the composition contain 1–5% $R_mO_n$, wherein $R_mO_n$ consists of SrO, BaO, $Y_2O_3$ and $La_2O_3$ and mixtures thereof. This patent also requires the ZnO:LiO molar ratio to be between about 1:4–1:9. The instant invention contains no $R_mO_n$ or mixtures thereof, nor does it even suggest the use of these secondary metal oxides.

U.S. Pat. No. 3,970,463 (Planchock et al.) discloses thermally crystallizable glass capable of being in situ crystallized to a glass-ceramic, wherein said glass consists of the following ingredients in weight percent: 52–78.4% $SiO_2$, 12.8–27.5% $Al_2O_3$, 2.4–7% $Li_2O$ and 0.25–6.7% ZnO. These glass-ceramic articles are utilized for products which are dimensionally stable at temperatures of at least 1500° C. over an extended period of time. As such, there is no discussion and/or concern as to the translucency of the glass-ceramic and the crystal phases crystallized within the glass-ceramic article.

U.S. Pat. No. 4,084,974 (Beall) describes light-absorbing glass-ceramic articles comprising β-spodumene and/or β-quartz as the principal crystal phase and exhibiting blue-to-black coloration. The coloration is provided for through the addition of a glass reducing agent to a titanium-containing lithium aluminosilicate glass batch for the parent glass. Using the method claimed, the glass-ceramic articles disclosed exhibited only one form of light transmittance, i.e., opaque or transparent across the article. Also, there is no mention of the formation of gahnite crystals within the article, which are so essential to the dimensional stability demonstrated by the articles of the present invention during the phase change from β-quartz to β-spodumene.

U.S. Pat. No. 4,057,434 (Rittler) relates to the manufacture of highly crystalline glass-ceramic articles wherein the primary crystal is a β-spodumene solid solution. The precursor glass composition consists essentially, by weight on the oxide basis, of about 2.5–4.5% $Li_2O$, 0.75–3.5% ZnO, 17.5–21.0% $Al_2O_3$, 65–71% $SiO_2$, and 3.5–6% $TiO_2$. However, unlike the present invention, the articles produced in this disclosure are opaque only, due to the growth of β-spodumene crystals as the principal crystal phase. Secondly, this reference teaches against the inclusion of $ZrO_2$ in the initial composition; thus being in opposition to the teaching herein requiring $ZrO_2$ as essential for clarity and the lack of color in the β-quartz crystal phase.

U.S. Pat. Nos. 4,211,820 and 4,835,121 (Cantaloupe and Shibuya, respectively), both described above, do not mention the formation of glass-ceramic articles possessing variable translucency across the article; rather, the articles possess constant light transmittance; i.e., they are essentially transparent vs. infrared transparent. Additionally, neither of these references discloses the formation of the gahnite crystals necessary for dimensional stability for phase transformation.

Lastly, Ser. No. 07/620,091 (Comte et al.), filed Nov. 30, 1990, is directed to the preparation of transparent glass-ceramic articles which, when rapidly crystallized from precursor glasses, exhibit minimal distortion. These articles contain β-quartz solid solution as the predominant crystal phase. However, there is no mention of another predominate crystal phase such as the β-spodumene required in the herein described invention.

BRIEF DESCRIPTION OF THE DRAWINGS

The FIGURE graphically illustrates transmittance characteristics of the present invention's Example 4 for red visible through infrared wavelengths.

DESCRIPTION OF THE PREFERRED EMBODIMENT

Tables II through IV list several exemplary compositions illustrative of the present invention, reported in weight percent on the oxide basis. The actual ingredients making up the starting batch may comprise any materials, either the oxides or any other compounds (e.g. carbonates), which, when melted together, will be converted into the desired oxide in the proper proportions. However, the materials chosen should be those containing a low iron content. The batch materials are then compounded and ball-milled together to aid in securing a homogeneous melt. The mixtures are then placed into either 500 cc silica or platinum crucibles and covered with a lid. The crucibles are then placed into a furnace where the batch is melted at 1625° C. for 16 hours with stirring, then poured into steel mold to produce a 4×8 in. rectangular slab. This slab is then transferred to an annealer operating at about 650° C.

Table I reports the heat treatment schedules to which the examples were subjected, each schedule being given a letter designation. Lithium aluminosilicate glasses within the inventive compositional range which are crystallized in situ at temperatures from approximately 850° C. to 950° C. (heat treatments A,D & E) tend to produce glass-ceramics wherein β-quartz constitutes the principal crystal. On the other hand, crystallization above 950° C. (heat treatments B & C) tends to produce glass-ceramics wherein β-spodumene constitutes the principal crystal phase, but also, and most importantly with at least 4% by weight gahnite being present.

TABLE I

| Letter Designation | Heat Treatment Schedule |
|---|---|
| A | Room temperature to 750° C. at 300°/hour |
|   | Raise temperature to 920° C. at 50° C./hour |
|   | Hold at 920° C. for ½ hour |
|   | Cool to room temperature at furnace rate |
| B | Room temperature to 750° C. at 300° C./hour |
|   | Raise temperature to 1000° C. at 50° C./hour |
|   | Hold at 1000° C. for ½ hour |
|   | Cool to room temperature at furnace rate |
| C | Room temperature to 750° C. at 300° C./hour |
|   | Raise temperature to 1050° C. at 50° C./hour |
|   | Hold at 1050° C. for ½ hour |
|   | Cool to room temperature at furnace rate |
| D | Room temperature to 750° C. at 300° C./hour |
|   | Raise temperature to 900° C. at 50° C./hour |
|   | Hold at 900° C. for ½ hour |
|   | Cool to room temperature at furnace rate |
| E | Room temperature to 750° C. at 300° C./hour |
|   | Raise temperature to 775° C. at 50° C./hour |
|   | Raise temperature to 810° C. at 10° C./hour |
|   | Raise temperature to 920° C. at 50° C./hour |
|   | Hold at 920° C. for ½ hour |

Table II reports the heat treatments applied to five different compositions along with the crystal phase(s) present in each as identified through x-ray diffraction analyses, a visual description of each (visual descr), the density of each ($\rho$), and the percent change of density (% $\Delta\rho$) resulting from the transformation of β-quartz crystals to β-spodumene and gahnite crystals.

In order to determine whether a glass article can undergo the phase change from β-quartz to β-spodumene without the excessive dimensional change, expressed in terms of density change, exceeding $+/-0.75\%$ which would likely result in cracking or dangerous lateral stresses, a comparison is made of a compositions' densities. Specifically, the density that a specific composition exhibits after being heat treated to generate β-quartz crystals therein, the A examples, is compared with the resulting density after the composition is heat treated at a higher temperature to convert the β-quartz crystals to β-spodumene plus gahnite, the B (and C) Examples. That is, the density of Example 1A is compared with those of Examples 1B and 1C, Example 2A with Examples 2B and 2C, 3A with 3B, 4A with 4B, 5A with 5B, etc.

Table II reports that all the compositions, 1 through 5, do not exceed the maximum $+/-0.75\%$ change in density allowed and claimed ($-0.70\%$ to $0.38\%$); therefore, the Examples show that the respective compositions have the ability to possess distinct and adjacent areas of the β-quartz and β-spodumene (containing gahnite) phases within the same glass-ceramic article. In other words, the compositions will not exhibit the excessive dimensional change during phase transformation which typically creates excessive stresses resulting in cracked articles.

Table II further illustrates that Examples 1A–5A, all compositions being subjected to the low temperature heat treatment of either Schedule A,D or E, contain β-quartz as essentially the sole crystal phase. On the other hand, Table II also reports that Examples 1B, 1C, 2B, 2C, 3B, 4B and 5B, all exposed to the higher temperature heat treatments of Schedules B or C, contain β-spodumene as the predominant crystal phase with a minor, but necessary, amount of gahnite as a secondary phase.

The visual descriptions of the Examples clearly illustrate the differences imported to the products depending upon the identity of the crystal phases present. Thus, the articles containing β-quartz as the predominant crystal phase are clear and essentially colorless, whereas those containing β-spodumene as the predominant crystal phase ranged from translucent to almost opaque.

Example 2C was polished to become about 5 mm in thickness and was subjected to measurements of transmittance from near the red visible wavelengths to the infrared light wavelengths, i.e. from approximately 500 to 5000 nm. The results are reported in the FIGURE.

TABLE II

|  | 1A | 1B | 1C | 2A |
|---|---|---|---|---|
| $SiO_2$ | 68.7 | 68.7 | 68.7 | 68.7 |
| $Al_2O_3$ | 19.4 | 19.4 | 19.4 | 19.4 |
| $Li_2O$ | 3.4 | 3.4 | 3.4 | 3.4 |
| ZnO | 2.8 | 2.8 | 2.8 | 2.8 |
| MgO | 1.0 | 1.0 | 1.0 | 1.0 |
| $ZrO_2$ | 3.0 | 3.0 | 3.0 | 3.0 |
| $TiO_2$ | 0.6 | 0.6 | 0.6 | 0.9 |
| $As_2O_5$ | 0.8 | 0.8 | 0.8 | 0.9 |
| $SnO_2$ | 0.3 | 0.3 | 0.3 | — |
| Heat Treatment | A | B | C | A |
| Major Crystal Phases | β-quartz | β-spodumene gahnite | β-spodumene gahnite | β-quartz |
| Visual Descr. | Transparent | White, very translucent | White, translucent | Transparent |
| Density ($\rho$) | 2.5589 | 2.5603 | 2.5675 | 2.5571 |
| % $\Delta\rho$ |  | −0.05 | −0.33 |  |

|  | 2B | 2C | 3A | 3B |
|---|---|---|---|---|
| $SiO_2$ | 68.7 | 68.7 | 67.3 | 67.3 |
| $Al_2O_3$ | 19.4 | 19.4 | 20.2 | 20.2 |
| $Li_2O$ | 3.4 | 3.4 | 3.9 | 3.9 |
| ZnO | 2.8 | 2.8 | 2.8 | 2.8 |
| MgO | 1.0 | 1.0 | 1.0 | 1.0 |
| $ZrO_2$ | 3.0 | 3.0 | 3.0 | 3.0 |
| $TiO_2$ | 0.9 | 0.9 | 1.0 | 1.0 |
| $As_2O_5$ | 0.9 | 0.9 | 0.8 | 0.8 |
| $SnO_2$ | — | — | — | — |
| Heat Treatment | B | C | D | C |
| Major Crystal Phases | β-spodumene gahnite | β-spodumene gahnite | β-quartz | β-spodumene gahnite |
| Visual Descr. | White, very translucent | White, translucent | Transparent | Slightly translucent |
| Density ($\rho$) | 2.5617 | 2.5667 | 2.5472 | 2.5446 |
| % $\Delta\rho$ | −0.18 | −0.38 |  | 0.11 |

|  | 4A | 4B | 5A | 5B |
|---|---|---|---|---|
| $SiO_2$ | 67.6 | 67.6 | 68.8 | 68.8 |
| $Al_2O_3$ | 19.5 | 19.5 | 19.6 | 19.6 |
| $Li_2O$ | 3.7 | 3.7 | 3.6 | 3.6 |
| ZnO | 4.5 | 4.5 | 2.0 | 2.0 |
| MgO | — | — | 1.2 | 1.2 |
| $ZrO_2$ | 2.0 | 2.0 | 3.0 | 3.0 |
| $TiO_2$ | 1.9 | 1.9 | 1.0 | 1.0 |
| $Na_2O$ | — | — | — | — |
| $Sb_2O_3$ | — | — | — | — |
| $As_2O_5$ | 0.8 | 0.8 | 0.8 | 0.8 |
| BaO | — | — | — | — |
| F | — | — | — | — |
| $SnO_2$ | — | — | — | — |
| Heat Treatment | D | C | E | C |
| Major Crystal Phases | β-quartz | β-spodumene gahnite | β-quartz | β-spodumene gahnite |
| Visual Descr. | Transparent | Slightly yellow & | Transparent | Translucent |

TABLE II-continued

|  |  | translucent |  |  |
|---|---|---|---|---|
| Density (p) | 2.5561 | 2.5741 | 2.5405 | 2.5369 |
| % Δp |  | −0.70 |  | 0.14 |

Table III records the composition and other relevant data, including heat-treatment, crystal phases present, densities of the respective phases of two thermally crystallizable glasses, expressed on the oxide basis in terms of weight percent. Although these examples have the requisite dimensional change when thermally changing from the β-quartz phase to the β-spodumene phase, 0.66% and 0.69% respectively,, the compositions A Examples, i.e., the β-quartz phase, lacks the desired clarity and colorlessness. The undesirable off-white coloration in Example 6A is due the relatively high $TiO_2$ (4.48%) found in its composition. Example 7A's yellowish hazy coloration is, in part, due to the inclusion of the modifier BaO. The addition of this modifier results in a substantial amount of residual glass remaining in the glass-ceramic material. This unwanted residual glass exacerbates the mismatch of refractive indexes between the glass and β-quartz crystal phases thus causing the resultant glass-ceramic article to exhibit a yellowish haze as a result of consequent scattering of light.

TABLE III

|  | 6A | 6B | 7A | 7B |
|---|---|---|---|---|
| $SiO_2$ | 68.7 | 68.7 | 64.6 | 64.6 |
| $Al_2O_3$ | 19.6 | 19.6 | 21.5 | 21.5 |
| $Li_2O$ | 3.7 | 3.7 | 3.25 | 3.25 |
| ZnO | 2.76 | 2.76 | 3.4 | 3.4 |
| MgO | — | — | 0.75 | 0.75 |
| $ZrO_2$ | — | — | 1.65 | 1.65 |
| $TiO_2$ | 4.48 | 4.48 | 2.55 | 2.55 |
| $Na_2O$ | 0.21 | 0.21 | — | — |
| $Sb_2O_3$ | — | — | — | — |
| $As_2O_5$ | 0.8 | 0.8 | 0.25 | 0.25 |
| BaO | — | — | 0.75 | 0.75 |
| F | 0.21 | 0.21 | — | — |
| $SnO_2$ | — | — | — | — |
| Heat Treatment | D | C | D | C |
| Major Crystal Phases | β-quartz | β-spodumene gahnite | β-quartz | β-spodumene gahnite |
| Visual Descr. | Amber transparent | Grayish translucent | Yellowish hazy | Yellowish translucent |
| Density (p) | 2.5530 | 2.5361 | 2.5854 | 2.6032 |
| % Δp |  | 0.66 |  | −0.69 |

Table IV records the composition and other relevant data, including heat-treatment and crystal phases present, of several thermally crystallizable glasses, expressed on the oxide basis in terms of weight percent, which are close to, but outside of, the scope of the present invention. Two of the compositions, represented by Examples 10A/10B and 11A/11B, are representative of compositions which contain too little $Li_2O$. In both compositions β-quartz remains in the higher temperature crystallization Examples, 10B & 11B, resulting in a too large of a percentage change in density, −2.63 & −2.82 respectively, between each compositions lower and higher temperature crystallization Example, i.e., between the A and B Examples. As was earlier discussed this large of a dimensional change would cause an article of this composition which was differentially heat-treated across its surface to experience excessive stresses resulting in cracked glass-ceramic article. The low lithia in Example 10's composition is alone the cause of the insufficient transformation from β-quartz to β-spodumene. On the other hand, Example 11's insufficient transformation is a result of the combination of the low, outside the claimed range, amount of lithia and the amount high ZnO in the starting composition.

In contrast, the other two compositions represented by Examples 8A/8B and 9A/9B are illustrative of compositions wherein the wrong crystal phases are present. As can be easily seen from Tables II and III, and as was earlier described, the proper major phases for the inventive glass-ceramic are β-quartz for the lower temperature crystallization A Examples and β-spodumene for the higher temperature crystallization B Examples. Table IV reports that all four examples contain cristobalite rather than β-quartz as the main crystal phase. The absence of β-quartz in the A Examples is partially due to the low amount, 3.05% as compared to the claimed range of 3.5–4.5%, of the $TiO_2/ZrO_2$ combination which serves as the nucleating agent for the β-quartz.

TABLE IV

|  | 8A | 8B | 9A | 9B |
|---|---|---|---|---|
| $SiO_2$ | 70.2 | 70.2 | 70.25 | 70.25 |
| $Al_2O_3$ | 18.4 | 18.4 | 19.85 | 19.85 |
| $Li_2O$ | 4.3 | 4.3 | 4.65 | 4.65 |
| ZnO | 3.7 | 3.7 | 1.70 | 1.70 |
| MgO | — | — | — | — |
| $ZrO_2$ | 1.6 | 1.6 | 1.6 | 1.6 |
| $TiO_2$ | 1.45 | 1.45 | 1.45 | 1.45 |
| $Na_2O$ | 0.1 | 0.1 | 0.1 | 0.1 |
| $Sb_2O_3$ | 0.3 | 0.3 | 0.3 | 0.3 |
| $As_2O_5$ | — | — | — | — |
| BaO | — | — | — | — |
| F | — | — | — | — |
| $SnO_2$ | — | — | — | — |
| Heat Treatment | D | C | D | C |
| Major Crystal Phases | Cristobalite, $ZrO_2$, $Li_2SiO_3$ | Zircon cristobalite $ZrO_2$ | Quartz, $ZrO_2$ cristobalite | $ZrO_2$ cristobalite zircon quartz |
| Visual Descr. | Opaque translucent | Opaque translucent | Opaque | Opaque |
| Density (p) | — | — | — | — |

|  | 10A | 10B | 11A | 11B |
|---|---|---|---|---|
| $SiO_2$ | 68.8 | 68.8 | 65.4 | 65.4 |
| $Al_2O_3$ | 19.4 | 19.4 | 21.0 | 21.0 |
| $Li_2O$ | 2.9 | 2.9 | 3.2 | 3.2 |
| ZnO | 3.2 | 3.2 | 4.8 | 4.8 |
| MgO | 0.9 | 0.9 | 0.8 | 0.8 |
| $ZrO_2$ | 3.0 | 3.0 | 3.0 | 3.0 |
| $TiO_2$ | 1.0 | 1.0 | 1.0 | 1.0 |
| $Na_2O$ | — | — | — | — |
| $Sb_2O_3$ | — | — | — | — |
| $As_2O_5$ | 0.8 | 0.8 | 0.8 | 0.8 |
| BaO | — | — | — | — |
| F | — | — | — | — |
| $SnO_2$ | — | — | — | — |
| Heat Treatment | D | C | D | C |
| Crystal Phases | β-quartz | β-quartz β-spodumene gahnite | β-quartz | β-quartz β-spodumene gahnite |
| Visual Descr. | Slightly hazy | Yellowish translucent | Slightly hazy | Yellowish translucent |
| Density (p) | 2.5568 | 2.6241 | 2.5841 | 2.6570 |
| % Δp |  | −2.63 |  | −2.82 |

As a result of their low dimensional change and their ideal visual description, i.e., a clear, transparent and essentially colorless β-quartz phase, combined with a white, translucent β-spodumene/graphite phase, Examples 1 (A-C) and 2 (A-C) are the most preferred compositions.

We claim:

1. A glass-ceramic article consisting of at least two distinct areas of different crystallizations, and consisting essentially, expressed in terms of weight percent on the oxide basis, of about 64-70% $SiO_2$, 18-22%, $Al_2O_3$, 3.3-4% $Li_2O$, 2-5% ZnO, 0-2% MgO, 1.5-3.5% $ZrO_2$, 0.5-5% $TiO_2$, 3.5-4.5% $ZrO_2+TiO_2$, 0.5-1.5% $As_2O_5$ and 0-0.5% $SnO_2$, comprising a first area of crystallization and a second area of crystallization, wherein the first area of crystallization is transparent and contains β-quartz as the sole crystal phase and the second area of crystallization selected from the group of either translucent, opaque or mixtures thereof and contains a major crystal phase of β-spodumene and a minor crystal phase of gahnite, the β-spodumene formed as a result of the thermal transformation of β-quartz, the gahnite being present in an amount sufficient to compensate for the thermal transformation such that dimensional change as a result of the thermal transformation, expressed in terms of density change, does not exceed ±0.75%.

2. A glass-ceramic article according to claim 1 wherein said gahnite is present in an amount of at least 4% by weight.

3. A glass-ceramic article according to claim 1 wherein said gahnite is present in an amount about between 4-11% by weight.

4. A clear, transparent and essentially colorless glass-ceramic, article containing β-quartz as the predominate crystal phase consisting essentially, expressed in terms of weight percent on the oxide basis, of about 64-70% $SiO_2$, 18-22% $Al_2O_2$, 3,3-4% $Li_2O$, 2-5% ZuO, 0-2% MgO, 1.5-3.5% $ZrO_2$, 0.5-5% $TiO_2$, 3.5-4.5% $ZrO_2+TiO_2$, 0.5-1.5% $As_2O_5$ and 0-0.5% $SnO_2$ and, which, when distinct areas of the glass-ceramic article are exposed to extreme temperatures, the distinct areas are rapidly thermally transformed into either opaque, translucent or opaque/translucent areas containing β-spodumene as the predominate crystal phase and gahnite as the minor crystal phase, wherein the dimensional change resulting from the thermal transformation, expressed in terms of density change, does not exceed +/−0.75%.

5. An white translucent glass-ceramic article demonstrating a transmittance to red and infrared wavelengths, through a polished plate of about 5 mm thickness, as illustrated in the FIGURE, wherein β-spodumene solid solution constitutes the principal crystal phase, consisting essentially, expressed in terms of weight percent on the oxide basis, of about 64-70% $SiO_2$, 18-22% $Al_2O_3$, 3.3-4% $Li_2O$, 2-5% ZnO, 0-2% MgO, 1.5-3.5% $ZrO_2$, 0.5-2.5% $TiO_2$, 3.5-4.5% $ZrO_2+TiO_2$, 0.5-1.5% $As_2O_5$ and 0-0.5% $SnO_2$.

6. A method for making a glass-ceramic article consisting of at least two distinct areas of different crystallization, which comprises the steps of:

a. melting a batch for a glass consisting essentially, expressed in terms of weight percent on the oxide basis, of about 64-70% $SiO_2$, 18-22% $Al_2O_3$, 3.3-4% $Li_2O$, 2-5% ZnO, 0-2% MgO, 1.5-3.5% $ZrO_2$, 0.5-2.5% $TiO_2$, 3.5-4.5% $ZrO_2+TiO_2$, 0.5-1.5% $As_2O_5$ and 0 0.5% $SnO_2$ and forming a glass article from the melt; and b. heating the glass article to a temperature range of about 700°-850° C.; and c. maintaining the temperature for a time sufficient to cause the article to obtain a high degree of nucleation; and, d. heating the glass article to a temperature range of about 850°-950° C.; and, at a rate of approximately 50° C./hour; and e. maintaining the temperature for a time sufficient to cause the article to crystallize in situ forming a crystallized article containing β-quartz as the predominate crystal phase; and then f. further heating selected and distinct areas of the crystallized article to a temperature of about 1000° C.; and maintaining the temperature at the selected areas for a time sufficient to cause the selected areas to re-crystallize in situ from β-quartz to a mixture of β-spodumene and gahnite, wherein the re-recrystallization results in a dimensional change, expressed in terms of density change, of not less than ±0.75%, g. cooling said crystallized article to room temperature.

7. The method according to claim 6 wherein the period of time sufficient to cause the article to crystallize in situ ranges between about ½-4 hours.

8. The method according to claim 6 wherein the period of time sufficient to cause the article to obtain a high degree of nucleation ranges between about 1-6 hours.

9. The method according to claim 6 wherein the said time sufficient to cause the article to re-crystallize in situ ranges between about ½-2 hours.

10. The method according to claim 6 wherein the article containing β-quartz as the predominate crystal phase is cooled to room temperature and then selected areas thereof are heated to a temperature of about 1000° C. to re-crystallize those selected areas from β-quartz to a mixture of β-spodumene and gahnite.

* * * * *

UNITED STATES PATENT AND TRADEMARK OFFICE
CERTIFICATE OF CORRECTION

PATENT NO. : 5,173,453
DATED : December 22, 1992
INVENTOR(S) : Beall et al.

It is certified that error appears in the above-identified patent and that said Letters Patent is hereby corrected as shown below:

Column 11, line 6, change "crystallizations" to --crystallization--.

Column 11, line 31, change "ceramic, article" to --ceramic article--.

Column 11, line 34, change "Al$_2$O$_2$" to --Al$_2$O$_3$--.

Column 11, line 34, change "3,3" to --3.3--.

Column 11, line 34, change "ZuO" to --ZnO--

Column 12, line 11, change "0 0.5%" to --0-0.5%--.

Column 12, line 32, change "re-recrystallization" to --recrystallization--.

Column 12, line 46, change "1/2-2" to --1/4-2--.

Signed and Sealed this

Sixteenth Day of November, 1993

Attest:

BRUCE LEHMAN

*Attesting Officer*  *Commissioner of Patents and Trademarks*